(12) United States Patent
Ebersol et al.

(10) Patent No.: US 11,568,009 B2
(45) Date of Patent: Jan. 31, 2023

(54) SPOILER PREVENTION

(71) Applicant: Microsoft Technology Licensing, LLC, Redmond, WA (US)

(72) Inventors: Geoffrey T. Ebersol, Woodinville, WA (US); Jeff West, Seattle, WA (US); Benjamin D. Kelly, Seattle, WA (US); Aaron M. Butcher, Redmond, WA (US); Felix G. T. I. Andrew, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 16/917,239

(22) Filed: Jun. 30, 2020

(65) Prior Publication Data

US 2021/0406326 A1 Dec. 30, 2021

(51) Int. Cl.
*G06F 16/00* (2019.01)
*G06F 16/9535* (2019.01)
*G06F 16/483* (2019.01)
*G06N 20/00* (2019.01)
(Continued)

(52) U.S. Cl.
CPC ........ *G06F 16/9535* (2019.01); *G06F 16/483* (2019.01); *G06F 16/951* (2019.01); *G06F 16/9538* (2019.01); *G06N 20/00* (2019.01)

(58) Field of Classification Search
CPC .. G06F 16/9535; G06F 16/483; G06F 16/951; G06F 16/9538; G06N 20/00
See application file for complete search history.

(56) References Cited

U.S. PATENT DOCUMENTS 8,612,534 B1 * 12/2013 Hossack ............. H04L 65/4015
709/206
10,395,175 B1 * 8/2019 Teodorescu-Badia ... G06N 5/04
(Continued)

OTHER PUBLICATIONS

Anonymous, "Method to Selectively Hide Entertainment/Sports Spoiler Data from User View", ip.com, Feb. 27, 2020, pp. 1-4 (Year: 2020).*

(Continued)

*Primary Examiner* — Jared M Bibbee
(74) *Attorney, Agent, or Firm* — Fiala & Weaver P.L.L.C.

(57) ABSTRACT

Methods, systems and computer program products are provided for spoiler prevention. Media consumption applications may be placed in "spoiler-free" mode, for example, to prevent media content from spoiling first-hand user experience. A user may provide and/or authorize access to and use of spoiler prevention information. A user may request media content (e.g., while surfing the Internet). Digital media content to be presented to a user may be searched in real-time and/or pre-searched for spoiler content and/or associated spoiler indications relative to spoiler prevention information. Identified spoiler content may be concealed from users. A procedure may be provided for users to determine one or more reasons why content is concealed, to selectively reveal concealed content, and to provide feedback whether concealed content was or was not spoiler content for a user. Feedback may be used to improve spoiler prevention, for example, by retraining a machine learning model, which may be user-specific.

20 Claims, 9 Drawing Sheets

(51) Int. Cl.
*G06F 16/951* (2019.01)
*G06F 16/9538* (2019.01)

(56) References Cited

U.S. PATENT DOCUMENTS

| | | | |
|---|---|---|---|
| 2007/0157237 A1* | 7/2007 | Cordray | H04N 21/4532 |
| | | | 725/42 |
| 2007/0157249 A1* | 7/2007 | Cordray | H04N 21/4825 |
| | | | 725/58 |
| 2014/0101706 A1* | 4/2014 | Kardatzke | H04N 21/4334 |
| | | | 725/86 |
| 2014/0297260 A1* | 10/2014 | Allen | G06F 40/169 |
| | | | 704/9 |
| 2015/0381689 A1* | 12/2015 | Ganesh | H04L 65/604 |
| | | | 705/14.58 |
| 2015/0382061 A1* | 12/2015 | Maisenbacher | H04N 21/4542 |
| | | | 725/28 |
| 2016/0057167 A1 | 2/2016 | Bach | |
| 2016/0301735 A1 | 10/2016 | Lind | |
| 2018/0152759 A1* | 5/2018 | Miller | H04N 21/454 |
| 2021/0352382 A1* | 11/2021 | Channapragada | |
| | | | H04N 21/4882 |

OTHER PUBLICATIONS

"International Search Report and Written Opinion Issued in PCT Application No. PCT/US21/034672", dated Sep. 17, 2021, 10 Pages.

* cited by examiner

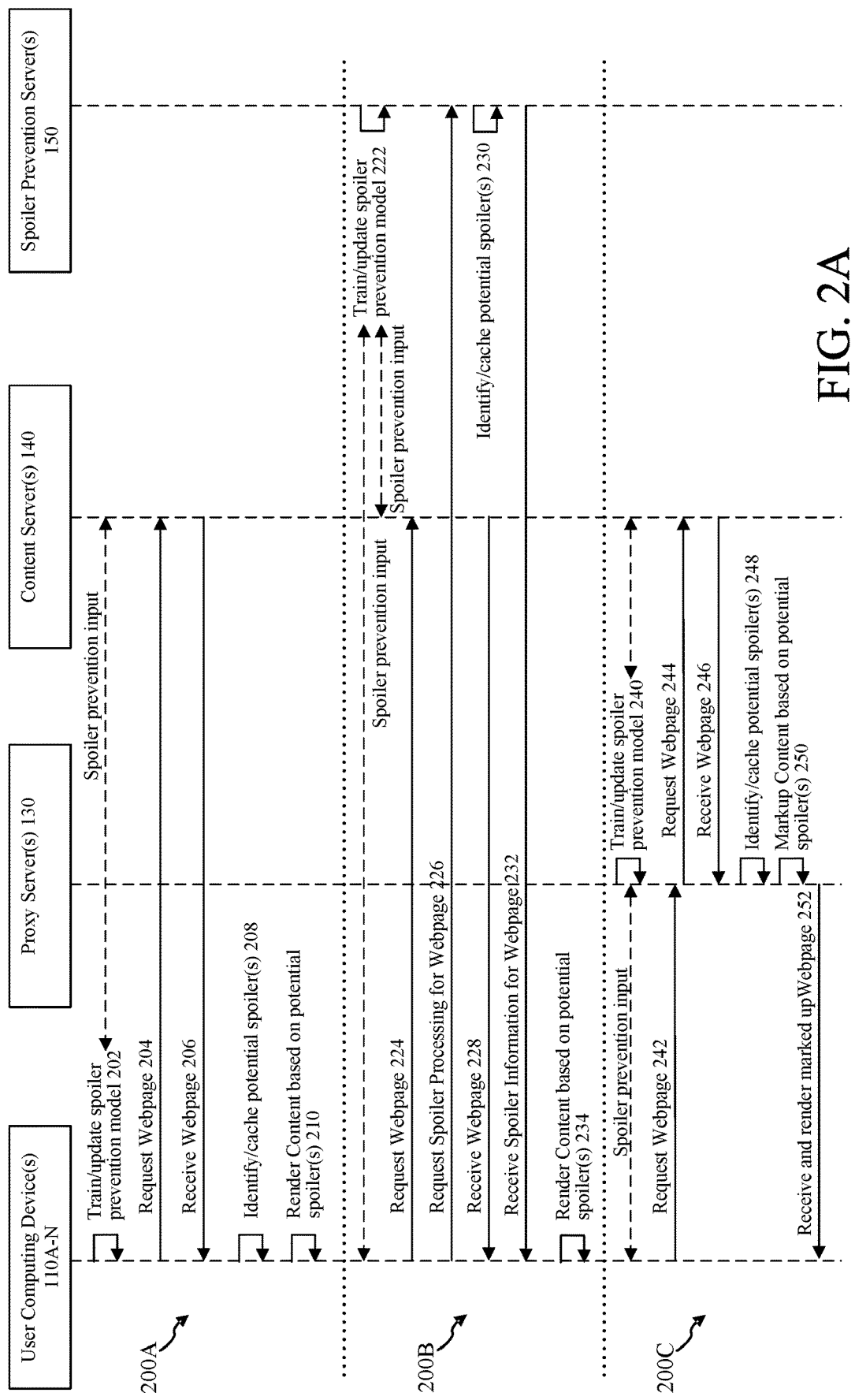

SPOILER PREVENTION

BACKGROUND

Browsing Internet content generated by others may spoil planned experiences, for example, by publishing sporting event results, plots or other details about television episodes, movies or books, etc., before users had the opportunity to experience them firsthand. Media content may often be unavoidable in various forms, such as advertisements, articles, comments, and social media.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for spoiler prevention. Media consumption applications (e.g., Web browsers) may be placed in "spoiler-free" mode, for example, to prevent media content (e.g., advertisements, articles, user posts, search results, etc. in the form of text, photos, videos, audio, etc.) from spoiling first-hand user experience (e.g., viewing a movie, viewing TV episodes, listening to a concert, viewing a sports competition, reading a book, etc.). A user may opt in/out of spoiler free mode. A user may provide spoiler prevention information (e.g., identify interests and media, such as movies, episodes, books, concerts, etc., the user has and has not experienced). A user may authorize automated access to and use of the user's information (e.g., streaming media service watch lists, social media interests). A user may request digital media content (e.g., while surfing the Internet). Digital media content to be presented to a user (e.g., and additional content, such as ads and/or user posts) may be searched in real-time and/or pre-searched (e.g., during web crawling and/or based on cached spoiler-related information for other content requests) for spoiler content and/or associated spoiler indications (e.g., spoiler content tags) relative to spoiler prevention information (e.g., movies, television series, sports competitions, books, and the like that a user has or has not experienced). Identified spoiler content may be concealed from users (e.g., by marking up Webpage code, blocking, removing, not displaying, covering, blurring, or not downloading content). A procedure may be provided for users to determine one or more reasons why content is concealed, to selectively reveal concealed content, and to provide feedback whether concealed content was or was not spoiler content for a user. Feedback may be used to improve spoiler prevention, for example, by retraining a machine learning model, which may be user-specific.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 2A and 2B show interaction diagrams for example methods for spoiler prevention, according to an example embodiment.

Figure 1:
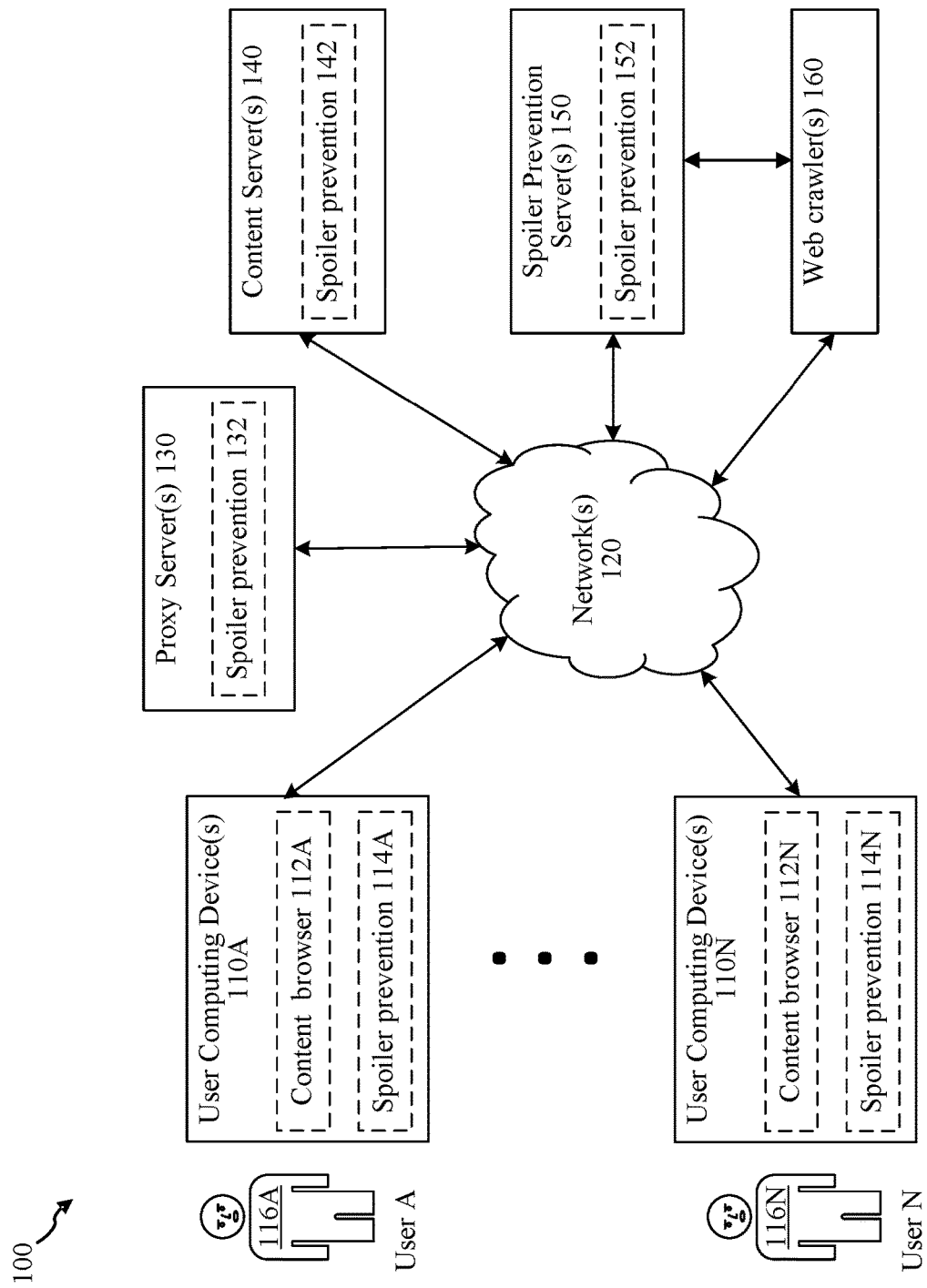
FIG. 1 shows a block diagram of a system for spoiler prevention, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

FIG. 1 shows a block diagram of a system for spoiler prevention, according to an example embodiment. Example system 100 presents one of many possible example implementations. System 100 may comprise any number of computing devices (e.g., including servers), such as example components illustrated in FIG. 1 and other additional or alternative devices not expressly illustrated. Other types of computing environments are also contemplated. Example system 100 includes network(s) 120, user computing device (s) 110A-N, content server(s) 140, proxy server(s) 130, spoiler prevention server(s) 150 and web crawler 160.

Network(s) 120 may include one or more of any of a local area network (LAN), a wide area network (WAN), a personal area network (PAN), a combination of communication networks, such as the Internet, and/or a virtual network. In example implementations, user computing device(s) 110A-N, content server(s) 140, proxy server(s) 130, spoiler prevention server(s) 150 and web crawler 160 may be communicatively coupled via network(s) 120. In an implementation, any one or more of user computing device(s) 110A-N, content server(s) 140, proxy server(s) 130, spoiler prevention server(s) 150 and web crawler 160 may communicate (e.g. via network(s) 120) via one or more application programming interfaces (APIs), and/or according to other interfaces and/or techniques. User computing device(s) 110A-N, content server(s) 140, proxy server(s) 130, spoiler prevention server(s) 150 and web crawler 160 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Client computing device(s) 110A-N may comprise one or more virtual machines, storage devices, servers, operating systems, applications, services, local processes, remote machines, web services, etc. that may be executed, hosted, and/or stored therein or via one or more other computing devices via network(s) 120. Client computing device(s) 110A-N may represent any number of computing devices. Client computing device(s) 110A-N may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Client computing device(s) 110A-N are not limited to physical machines, but may include other types of machines or nodes, such as a virtual machine.

Client computing device(s) 110A-N may comprise, respectively, content browser 112A-N. Content browser 112A-N may comprise, for example, a general or specific content browsing application, such as a Web browser application that may be used to display public and/or private content (e.g., based on user credentials) for one or more content providers. However, content browser 112A-N is not limited to Web browser and may comprise any application that is capable of presenting content to a user (e.g., a social media application, a media player applicating, a gaming application, or the like). In some example implementations, client computing device(s) 110A-N may comprise, respectively, spoiler prevention 114A-N. Spoiler prevention 114A-N may perform all or a portion of spoiler prevention operations. In some examples, spoiler prevention 114A-N may perform all spoiler prevention operations. In some examples, client computing device(s) 110A-N may receive unfiltered content, filtered content and/or marked up content and provide spoiler prevention operations based on the type or status of received content. In some examples, spoiler prevention 114A-N may comprise an agent of spoiler prevention 132, 142 and/or 152.

Content server(s) 140 may comprise one or more virtual machines, storage devices, servers, operating systems, applications, services, local processes, remote machines, web services, etc. that may be executed, hosted, and/or stored therein or via one or more other computing devices via network(s) 120. Content server(s) 140 may represent any number of computing devices. Content server(s) 140 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Content server(s) 140 are not limited to physical machines, but may include other types of machines or nodes, such as a virtual machine.

Content server(s) 140 may host content provider websites. Content server(s) 140 may provide digital media content (e.g. webpage content, advertisements, and so on) upon request to content browser 112A-N. In examples, search engines may be considered content providers, given that results may comprise text, photos, videos and other content provided in response to user queries. In some example implementations, content server(s) 140 may comprise spoiler prevention 142. Spoiler prevention 142 may perform all or a portion of spoiler prevention operations. In some examples, spoiler prevention 142 may perform all spoiler prevention operations, for example, for content present on respective content server(s). In examples, content server(s) 140 may receive requests for content accompanied by spoiler prevention arguments for use by content server(s) 140 to filter (e.g., conceal or otherwise indicate) spoiler content. In some examples, content server(s) 140 may provide marked up content with spoiler content indicators that may be processed by spoiler prevention 114A-N to determine whether to identify and conceal content as spoiler content based on spoiler prevention information for user A-N 116A-N. Mark ups provided by content server(s) 140 may be general (e.g., for multiple users) or specific (e.g., for a particular user). In some examples, spoiler prevention 114A-N may comprise an agent of spoiler prevention 142.

Proxy server(s) 130 may comprise one or more virtual machines, storage devices, servers, operating systems, applications, services, local processes, remote machines, web services, etc. that may be executed, hosted, and/or stored therein or via one or more other computing devices via network(s) 120. Proxy server(s) 130 may represent any number of computing devices. Proxy server(s) 130 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Proxy server(s) 130 are not limited to physical machines, but may include other types of machines or nodes, such as a virtual machine.

Proxy server(s) 130 may provide one or more proxy services to user computing device(s) 110A-N. Proxy server(s) 130 may operate as an intermediary between user computing device(s) 110A-N and content server(s) 140. In some example implementations, proxy server(s) 130 may comprise spoiler prevention 132. Spoiler prevention 132 may perform all or a portion of spoiler prevention operations. In some examples, spoiler prevention 132 may perform all spoiler prevention operations, for example, for content requested by user computing device(s) 110A-N and received from content server(s) 140. In examples, proxy server(s) 130 may receive requests for content. Proxy server(s) 130 may be aware of a user's spoiler prevention information and/or may receive spoiler prevention in the form of arguments associated with content requests for use by proxy server(s) 130 to filter (e.g., conceal or otherwise indicate) spoiler content in content provided to user computing device(s) 110A-N. In some examples, proxy server(s) 130 may provide marked up content with spoiler content indicators that may be processed by spoiler prevention 114A-N to determine whether to identify and conceal content as spoiler content based on spoiler prevention information for user A-N 116A-N. Mark ups provided by proxy server(s) 130 may be general (e.g., for multiple users) or specific (e.g., for a particular user). In some examples, spoiler prevention 114A-N may comprise an agent of spoiler prevention 132.

Spoiler prevention server(s) 150 may comprise one or more virtual machines, storage devices, servers, operating systems, applications, services, local processes, remote machines, web services, etc. that may be executed, hosted, and/or stored therein or via one or more other computing devices via network(s) 120. Proxy server(s) 130 may represent any number of computing devices. Spoiler prevention server(s) 150 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Spoiler prevention server(s) 150 are not limited to physical machines, but may include other types of machines or nodes, such as a virtual machine.

Spoiler prevention server(s) 150 may provide one or more services to user computing device(s) 110A-N. Spoiler prevention server(s) 150 may comprise spoiler prevention 152 to provide spoiler prevention services for one or more of user computing device(s) 110A, proxy server(s) 130, content server(s) 140 and/or web crawler 160. Spoiler prevention 152 may perform all or a portion of spoiler prevention operations. In some examples, spoiler prevention 152 may perform all spoiler prevention operations, for example, for content requested by user computing device(s) 110A-N from content server(s) 140. For example, user computing device(s) 110A-N may call spoiler prevention server(s) 150 to process content located on content server(s) 140 based on a user's spoiler prevention information to identify whether there are any content spoilers. In examples, user computing device(s) 110A-N may request content from content server(s) 140 and (e.g., simultaneously) request spoiler prevention services from spoiler prevention server(s) 150 based on the content requested from content server(s) 140. Spoiler prevention 152 may be aware of spoiler prevention information for one or more users (e.g., a spoiler prevention database) and/or spoiler prevention 152 may receive a user's spoiler prevention information in a call for spoiler prevention services.

Spoiler prevention server(s) 150 may use a user's spoiler prevention information to process content requested from content server(s) 140, indicating any spoiler content therein in a response provided to user computing device(s) 110A-N. Spoiler prevention 114A-N may use spoiler content information in the response from spoiler prevention 152 to process (e.g., filter) requested content received from content server(s) 140. Spoiler prevention 114A-N may determine whether to conceal content as spoiler content based upon comparing spoiler information in the response received from spoiler prevention 152 to spoiler prevention information for respective user A-N 116A-N. In some examples, spoiler prevention 114A-N may comprise an agent of spoiler prevention 152.

Web crawler(s) 160 may crawl the world wide web (WWW) to index content for a search engine. Spoiler prevention server(s) 150 may be integrated with web crawler(s) 160 or may operate by analyzing indexed content and maintaining spoiler content information, for example, to provide spoiler prevention services to user computing device(s) 110A-N, proxy server(s) 130 and/or content server(s) 140.

Figure 2B:
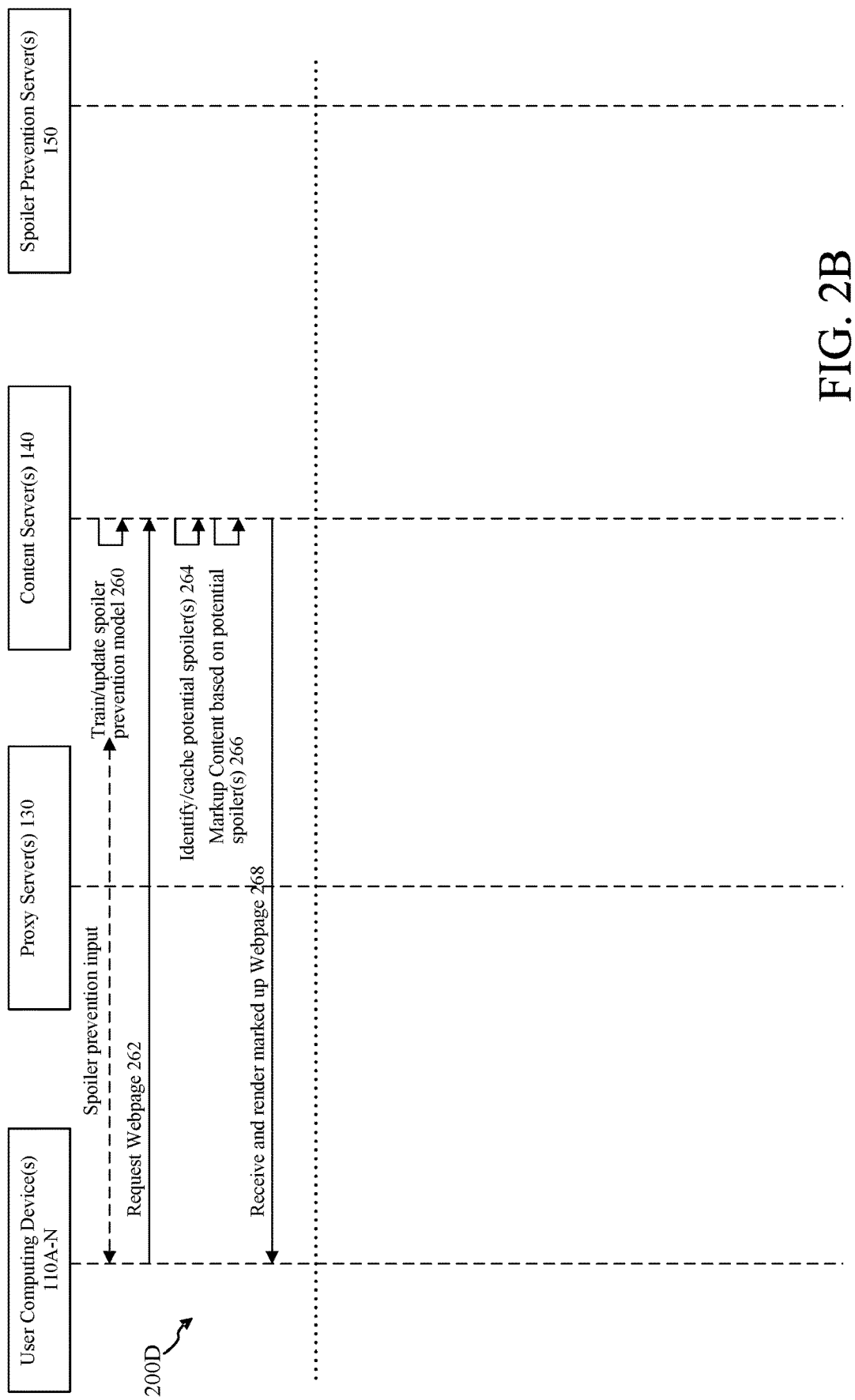

Example operation of various examples shown in FIG. 1 are discussed with respect to several example interaction diagrams in FIGS. 2A and 2B.

FIGS. 2A and 2B show interaction diagrams for example methods for spoiler prevention, according to an example embodiment. FIGS. 2A and 2B show four example interaction diagrams 200A-200D, which present only several of many possible example implementations of spoiler prevention. Example interaction diagrams 200A-200D are discussed with reference to the several examples of spoiler prevention shown in FIG. 1. Embodiments disclosed herein and other embodiments may operate in accordance with example interaction diagrams 200A-200D. Example interaction diagram 200A comprises example steps 202-210. Example interaction diagram 200B comprises example steps 222-234. Example interaction diagram 200C comprises example steps 240-252. Example interaction diagram 200D comprises example steps 260-268. However, other embodiments may operate according to other interactions, with the same, different, more or fewer interaction participants and/or steps. There is no requirement that an interaction embodiment implement all of the interaction participants or steps illustrated in FIG. 2A or 2B. Other structural and operational embodiments will be apparent to persons skilled in the relevant art(s) based on the discussion of embodiments. No order of steps is required unless expressly indicated or inherently required.

Example interaction diagram 200A shown in FIG. 2A is based on spoiler prevention being performed, at least in part, by spoiler prevention 114A-N operating on user computing device(s) 110A-N. Example interaction diagram 200A is based on an implementation of spoiler prevention using a machine learning (ML) model. Other implementations may or may not use an ML model.

In step 202, a spoiler prevention model may be trained and/or updated. For example, an ML model (e.g., a user-specific ML model) may be trained based on spoiler prevention information initially obtained for a user. In an example, model training may include asking a user to indicate what input a model should use, such as interests specified for a search engine (e.g., Microsoft Bing), interests specified on a social media account (e.g., Facebook), one or more online subscriptions with content providers (e.g., Netflix, Amazon Prime Video, Hulu), separate (e.g., manual) input (e.g., in a question and answer format), etc. An ML model may determine which information is more important for accurate predictions. A testing phase may, for example, access one or more training websites (e.g., content server(s) 140) with a variety of simulated spoiler and non-spoiler content. A user may provide feedback to indicate whether a series of predictions of spoiler and non-spoiler content displayed to the user is accurate based on the user's spoiler prevention information provided to the model. An ML model may be retrained/updated, for example, based on new spoiler prevention information and/or user feedback of model performance, such as indicating whether the model accurately predicted and concealed spoiler content.

In step 204, user computing device(s) 110A-N (e.g., a Web browser such as Microsoft Edge running on a user computing device) may request a webpage from content server(s) 140.

In step 206, user computing device(s) 110A-N (e.g., a Web browser such as Microsoft Edge running on a user computing device) may receive the requested webpage from content server(s) 140.

In step 208, spoiler prevention 114A-N (e.g., a trained ML model) operating on computing device(s) 110A-N may analyze the received webpage content to determine whether any content is spoiler content, for example, as disclosed herein. Spoiler prevention 114A-N may, for example, identify spoiler content in the Webpage content.

In step 210, the Webpage content may be rendered based on the results of step 208 (e.g., whether any Webpage content is identified as spoiler content). For example, the Webpage may be rendered with content determined to be non-spoiler shown or otherwise accessible to a user and content determined to be spoiler content concealed from a user (e.g., with a procedure for a user to selectively reveal concealed content). Spoiler content information may be cached, for example, for future use, uploading to a Web content index, etc.

Example interaction diagram 200B shown in FIG. 2A is based on spoiler prevention being performed, at least in part, by spoiler prevention 152 operating on spoiler prevention server(s) 150. Example interaction diagram 200B is based on an implementation of spoiler prevention using a machine learning (ML) model. Other implementations may or may not use an ML model.

In step 222, a spoiler prevention model may be trained and/or updated. For example, an ML model (e.g., a user-specific ML model) may be trained based on spoiler prevention information initially obtained for a user. In an example, model training may include asking a user to indicate what input a model should use, such as interests specified for a search engine (e.g., Microsoft Bing), interests specified on a social media account (e.g., Facebook), one or more online subscriptions with content providers (e.g., Netflix, Amazon Prime Video, Hulu), separate (e.g., manual) input (e.g., in a question and answer format), etc. An ML model may determine which information is more important for accurate predictions. A testing phase may, for example, access one or more training websites (e.g., content server(s) 140) with a variety of simulated spoiler and non-spoiler content. A user may provide feedback to indicate whether a series of predictions of spoiler and non-spoiler content displayed to the user is accurate based on the user's spoiler prevention information provided to the model. An ML model may be retrained/updated, for example, based on new spoiler prevention information and/or user feedback of model performance, such as indicating whether the model accurately predicted and concealed spoiler content.

In step 224, user computing device(s) 110A-N (e.g., a Web browser running on a user computing device) may request a webpage from content server(s) 140.

In step 226, user computing device(s) 110A-N (e.g., a Web browser running on a user computing device) and/or spoiler prevention 114A-N (e.g., a trained ML model) may request spoiler prevention service from spoiler prevention server(s) 150 for the requested Webpage. The request may, for example, pass the URL of the requested Webpage.

In step 228, user computing device(s) 110A-N (e.g., a Web browser running on a user computing device) may receive the requested webpage from content server(s) 140.

In step 230, spoiler prevention 152 (e.g., a trained ML model) operating on spoiler prevention server(s) 150 may analyze the received webpage content to determine whether any content is spoiler content, for example, as disclosed herein. Spoiler prevention 152 may, for example, identify spoiler content in the Webpage content. Spoiler content information may be cached, for example, for future use, uploading to a Web content index, etc.

In step 232, spoiler prevention 152 may return spoiler content information for the received webpage. In an example, the spoiler content information may be provided in the form of a Webpage markup concealing spoiler content.

In step 234, the Webpage content may be rendered based on the spoiler content information received in step 232 (e.g., indicating whether any Webpage content is identified as spoiler content). For example, the Webpage may be rendered with content determined to be non-spoiler shown or otherwise accessible to a user and content determined to be spoiler content concealed from a user (e.g., with a procedure for a user to selectively reveal concealed content).

Example interaction diagram 200C shown in FIG. 2A is based on spoiler prevention being performed, at least in part, by spoiler prevention 132 operating on proxy server(s) 130. Example interaction diagram 200C is based on an implementation of spoiler prevention using a machine learning (ML) model. Other implementations may or may not use an ML model.

In step 240, a spoiler prevention model may be trained and/or updated. For example, an ML model (e.g., a user-specific ML model) may be trained based on spoiler prevention information initially obtained for a user. In an example, model training may include asking a user to indicate what input a model should use, such as interests specified for a search engine (e.g., Microsoft Bing), interests specified on a social media account (e.g., Facebook), one or more online subscriptions with content providers (e.g., Netflix, Amazon Prime Video, Hulu), separate (e.g., manual) input (e.g., in a question and answer format), etc. An ML model may determine which information is more important for accurate predictions. A testing phase may, for example, access one or more training websites (e.g., content server(s) 140) with a variety of simulated spoiler and non-spoiler content. A user may provide feedback to indicate whether a series of predictions of spoiler and non-spoiler content displayed to the user is accurate based on the user's spoiler prevention information provided to the model. An ML model may be retrained/updated, for example, based on new spoiler prevention information and/or user feedback of model performance, such as indicating whether the model accurately predicted and concealed spoiler content.

In step 242, user computing device(s) 110A-N (e.g., a Web browser running on a user computing device) may request a webpage from proxy server(s) 130.

In step 244, proxy server(s) 130 may request the webpage from content server(s) 140.

In step 246, proxy server(s) 130 may receive the requested webpage from content server(s) 140.

In step 248, spoiler prevention 132 (e.g., a trained ML model) operating on proxy server(s) 130 may analyze the received webpage content to determine whether any content is spoiler content, for example, as disclosed herein. Spoiler prevention 132 may, for example, identify spoiler content in the Webpage content. Spoiler content information may be cached, for example, for future use, uploading to a Web content index, etc.

In step 250, spoiler prevention 132 may indicate any identified spoiler content information in the form of a Webpage markup that conceals spoiler content (e.g., with a procedure for a user to selectively reveal concealed content).

In step 252, proxy server(s) 130 may send the marked up webpage content, which may be received by user computing device(s) 110A-N. Computing device(s) 110A-N may render the marked up webpage content. For example, the webpage may be rendered with content determined to be non-spoiler shown or otherwise accessible to a user and content determined to be spoiler content concealed from a user (e.g., with a procedure for a user to selectively reveal concealed content).

Example interaction diagram 200D shown in FIG. 2B is based on spoiler prevention being performed, at least in part, by spoiler prevention 144 operating on content server(s) 140. Example interaction diagram 200D is based on an implementation of spoiler prevention using a machine learning (ML) model. Other implementations may or may not use an ML model.

In step 260, a spoiler prevention model may be trained and/or updated. For example, an ML model (e.g., a user-specific ML model) may be trained based on spoiler prevention information initially obtained for a user. In an example, model training may include asking a user to indicate what input a model should use, such as interests specified for a search engine (e.g., Microsoft Bing), interests specified on a social media account (e.g., Facebook), one or more online subscriptions with content providers (e.g., Netflix, Amazon Prime Video, Hulu), separate (e.g., manual) input (e.g., in a question and answer format), etc. An ML model may determine which information is more important for accurate predictions. A testing phase may, for example, access one or more training websites (e.g., content server(s) 140) with a variety of simulated spoiler and non-spoiler content. A user may provide feedback to indicate whether a series of predictions of spoiler and non-spoiler content displayed to the user is accurate based on the user's spoiler prevention information provided to the model. An ML model may be retrained/updated, for example, based on new spoiler prevention information and/or user feedback of model performance, such as indicating whether the model accurately predicted and concealed spoiler content.

In step 262, user computing device(s) 110A-N (e.g., a Web browser running on a user computing device) may request a webpage from content server(s) 140.

In step 264, spoiler prevention 142 (e.g., a trained ML model) operating on content server(s) 140 may analyze the requested webpage content to determine whether any content is spoiler content, for example, as disclosed herein. Spoiler prevention 142 may, for example, identify spoiler content in the Webpage content. Spoiler content information may be cached, for example, for future use, uploading to a Web content index, etc.

In step 266, spoiler prevention 142 may indicate any identified spoiler content information in the form of a Webpage markup that conceals spoiler content (e.g., with a procedure for a user to selectively reveal concealed content).

In step 268, content server(s) 140 may send the marked up webpage content, which may be received by user computing device(s) 110A-N. Computing device(s) 110A-N may render the marked up webpage content. For example, the webpage may be rendered with content determined to be non-spoiler shown or otherwise accessible to a user and content determined to be spoiler content concealed from a user (e.g., with a procedure for a user to selectively reveal concealed content).

Figure 3A:
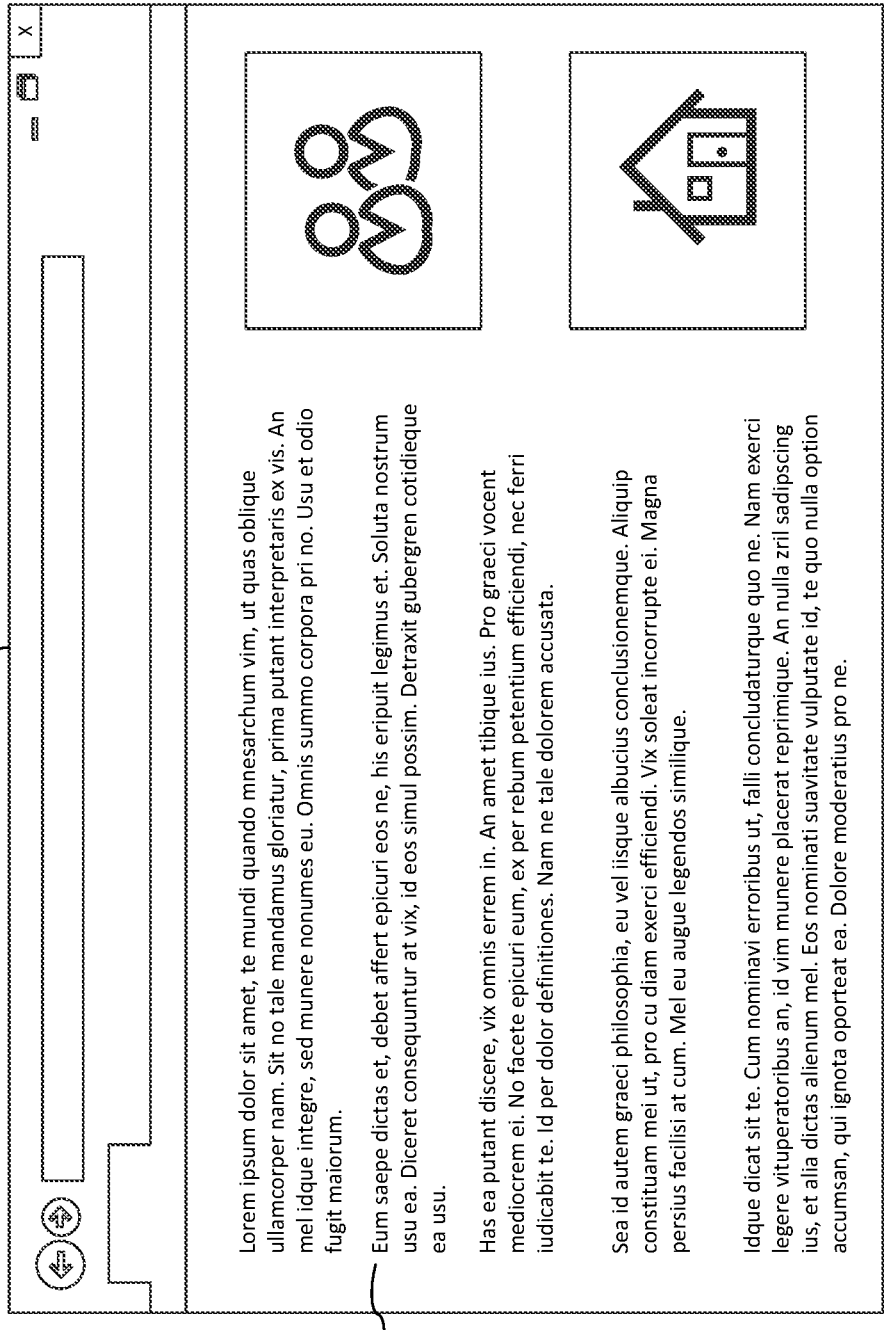
FIGS. 3A-3D shows an example presentation of media content with a user interface procedure to selectively reveal concealed spoiler content, according to an example embodiment.

FIGS. 3A-3D show an example presentation of media content with a user interface procedure to selectively reveal concealed spoiler content, according to an example embodiment. FIG. 3A shows example 300A, where an example of digital media content 305 is displayed within graphical user interface 310 generated by content browser 112A-N. Example 300A may represent performance of a web browser when a user has disabled spoiler prevention mode, for example, presenting digital media content without filtering content before presentation to a user.

Figure 3B:
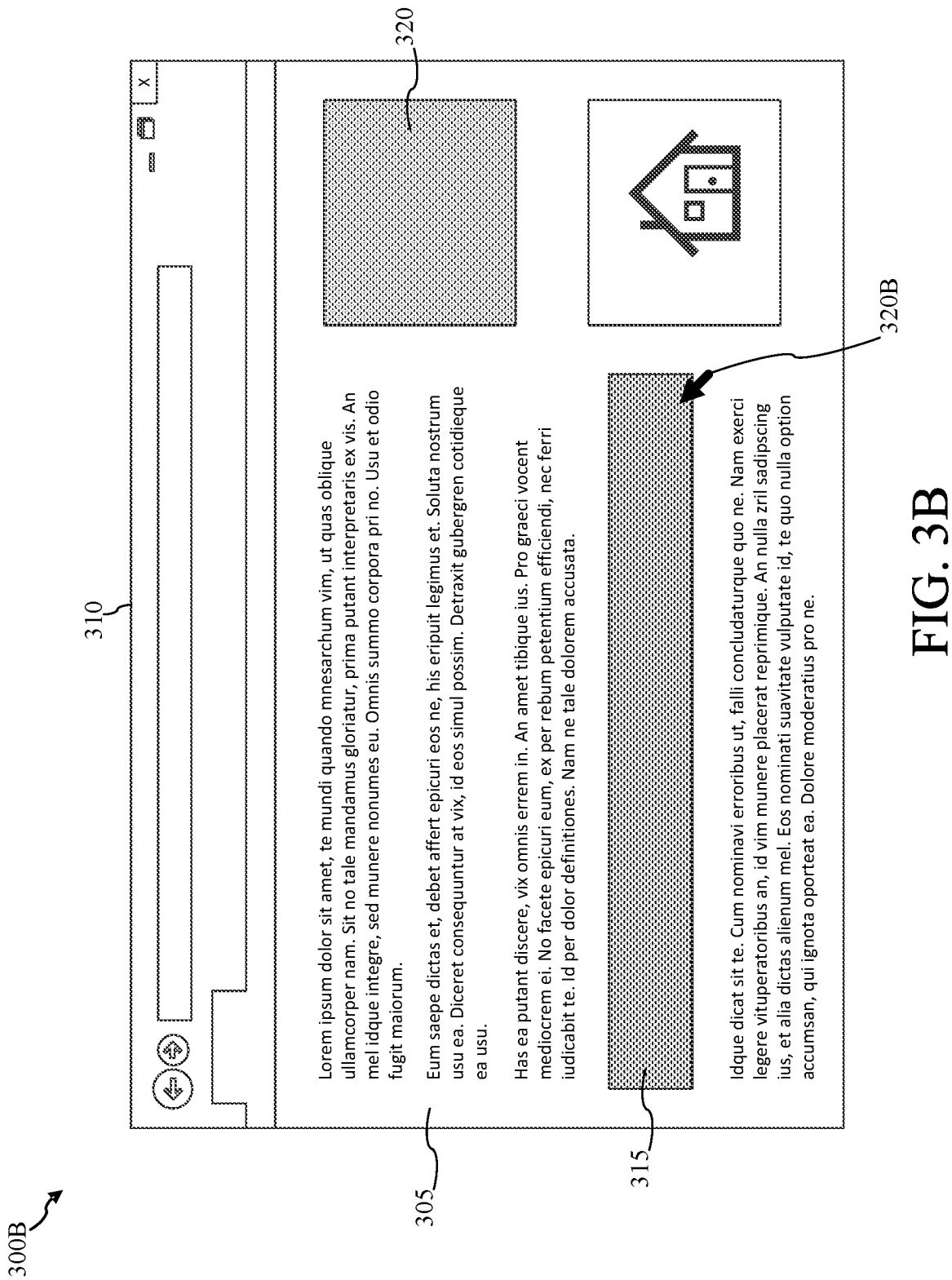

FIG. 3B shows example 300B, where an example of digital media content 305 is displayed within graphical user interface 310 generated by content browser 112A-N. Example 300B may represent performance of a web browser when a user has enabled and/or selected spoiler prevention mode, for example, filtering digital media content before presentation to a user. For example, as shown in FIG. 3B, a first portion 315 and a second portion 320 of digital media content 305 are concealed. Concealment may include one or more of the following, for example, blocking, removing, not displaying, covering, blurring, and not downloading digital media content identified as spoiler content. A procedure may be provided for a user to interact with concealed content. For example, as shown in FIG. 3B, a user may express interest in concealed content by positioning a pointer in a first position 320B over, on or near the first portion of concealed content 315.

Figure 3C:
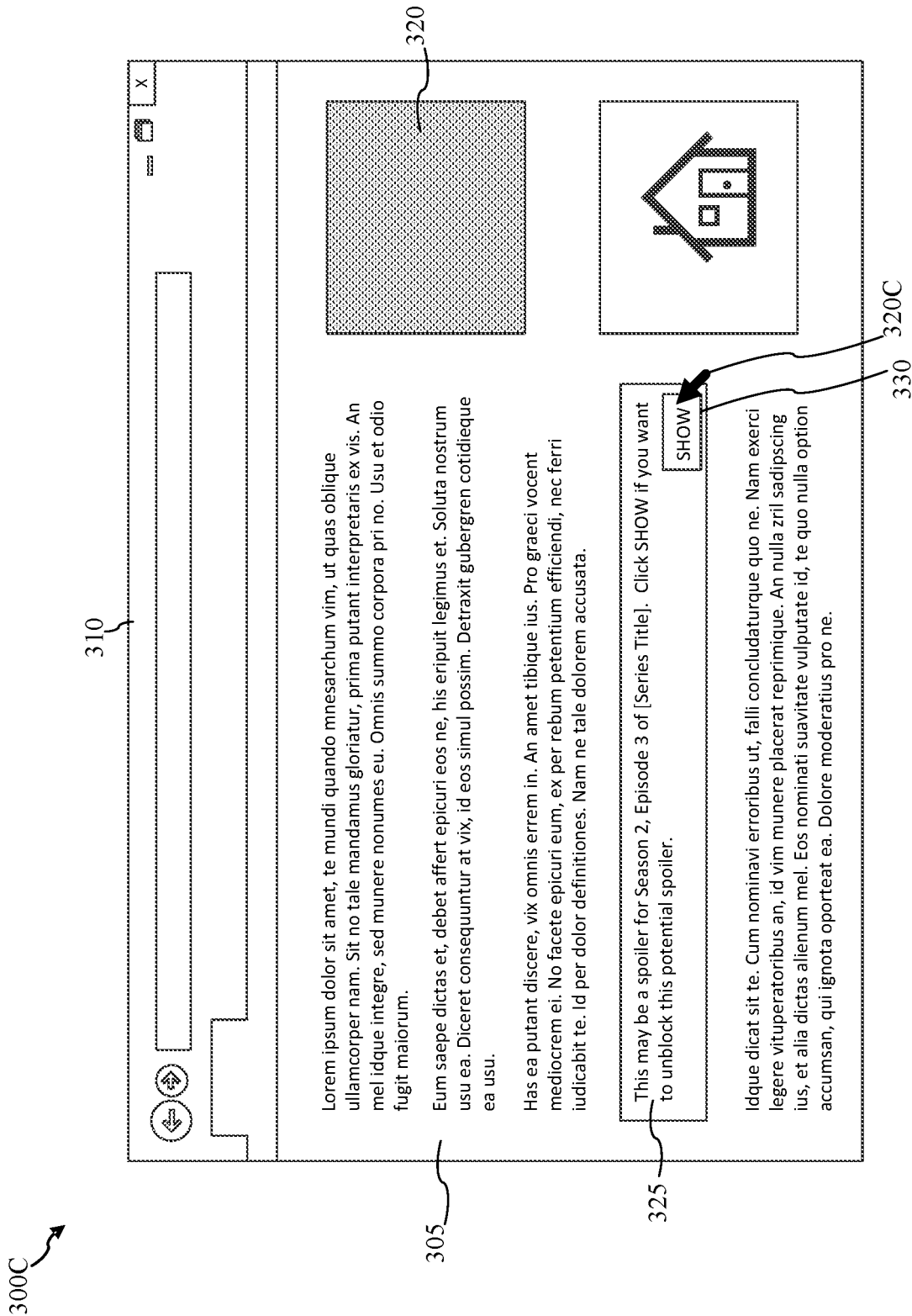

FIG. 3C shows example 300C, where a user may interact with a procedure regarding concealed content. For example, as shown in FIG. 3C, a procedure may be provided for a user to interact with concealed content. The procedure may, for example as shown in FIG. 3C, respond to a user showing interest in concealed content (e.g., by positioning a pointer in first position 320B over, on or near the first portion of concealed content 315) by displaying a message, such as message 325, indicating a reason why the first portion of digital media content 305 was identified (e.g., and concealed) as spoiler content. For example, message 325 may state, "This may be a spoiler for Season 2, Episode 3 of [Series Title]. Click SHOW if you want to unblock this potential spoiler." Spoiler prevention information may indicate that the user has not experienced (e.g., viewed) "Season 2, Episode 3 of [Series Title]." A selectable control (e.g., SHOW) 330 may be provided for a user to selectively reveal the concealed content. As shown in FIG. 3C, a user may request that the concealed content be revealed by positioning a pointer (e.g., a cursor) in a second position 320C over, on or near selectable control 330 (e.g., and clicking) to select "SHOW." A user may, alternatively, indicate that the concealed content should remain concealed, for example, by not selecting "SHOW" by pointer positioning and/or clicking.

Figure 3D:
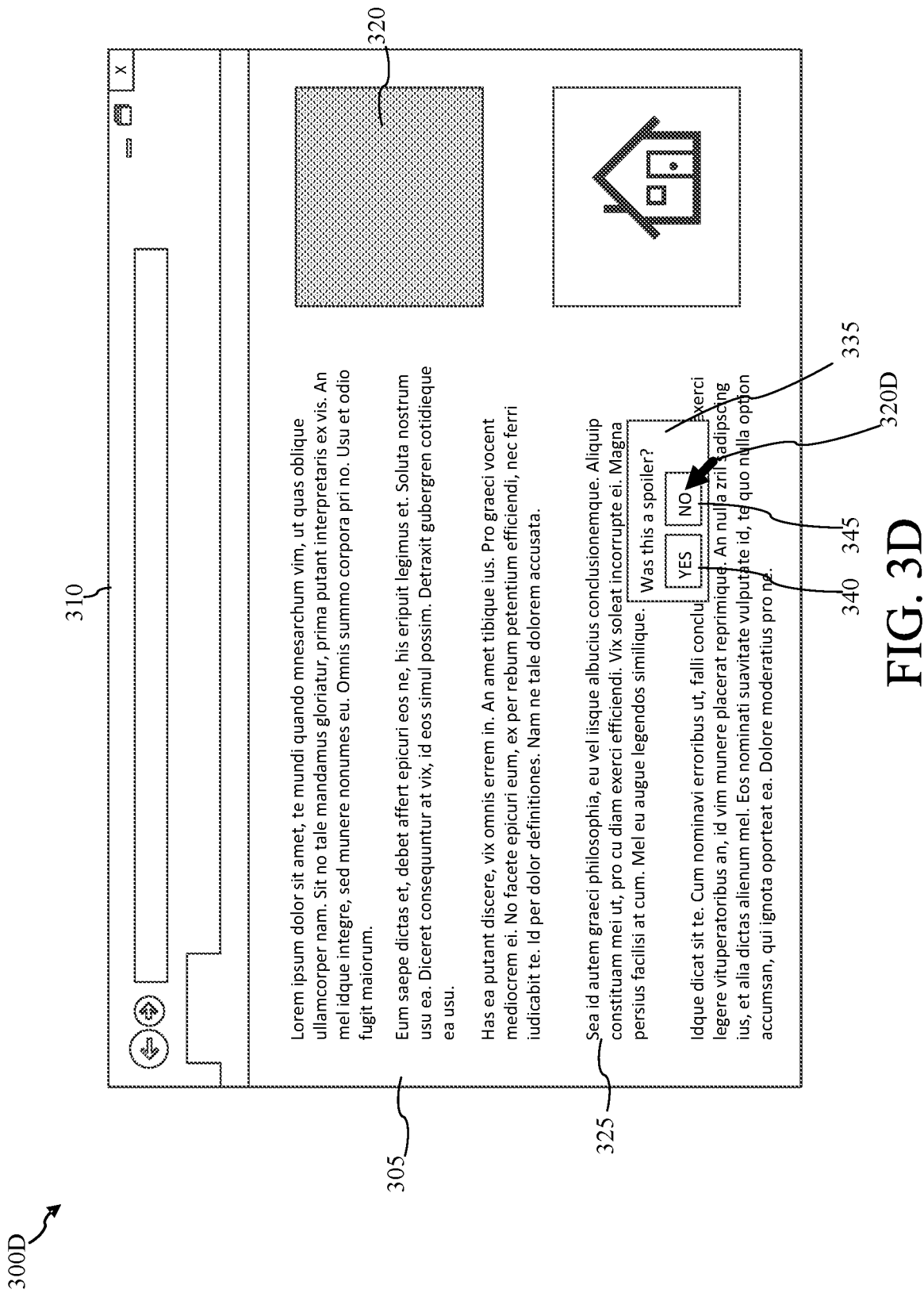

FIG. 3D shows example 300D, where a user may interact with a procedure regarding concealed content. For example, as shown in FIG. 3D, a procedure may be provided for a user to interact with concealed content. The procedure may, for example as shown in FIG. 3D, respond to a user selectively requesting that concealed content be revealed (e.g., by positioning a pointer in second position 320C over, on or near selectable control 330 with or without clicking depending on the implementation) by revealing the concealed content (e.g., first portion 315). In examples, revealing concealed content may be accompanied by a message (e.g., a question) 335 requesting feedback, such as a request to indicate whether the spoiler prevention method accurately or inaccurately determined the content to be a spoiler. The message may be accompanied with selectable controls "YES" 340 and "NO" 345. A user may provide feedback, for example, by positioning a pointer (e.g., a cursor) in a third position 320D over, on or near selectable control "YES" 340 or "NO" 345 (e.g., and clicking) to indicate whether the revealed content was or was not a spoiler for the user. The user's feedback may be used to improve performance of the spoiler prevention method, for example, by updating spoiler prevention information and/or by retraining or calibrating a machine learning model.

It may be observed that in the example procedure and interaction shown in FIGS. 3B-3D, second portion 320 was unaffected by user interaction with a procedure for first part 315. In examples, a procedure may be implemented separately for each portion of concealed content, combined for all portions of concealed content and/or selectively for a portion of concealed content or all concealed content. Portions of content may be concealed for different reasons. For example, a first portion may be concealed based on a first portion of spoiler prevention information (e.g., a book the user has yet to experience) while a second portion may be concealed based on a second portion of spoiler prevention information (e.g., a television series episode a user has yet to experience).

Implementations are not limited to the examples shown. Example system 100 or components therein, and/or other systems and components in other examples may operate, for example, according to example interaction diagrams and methods presented in FIGS. 2A, 2B and 4.

Figure 4:
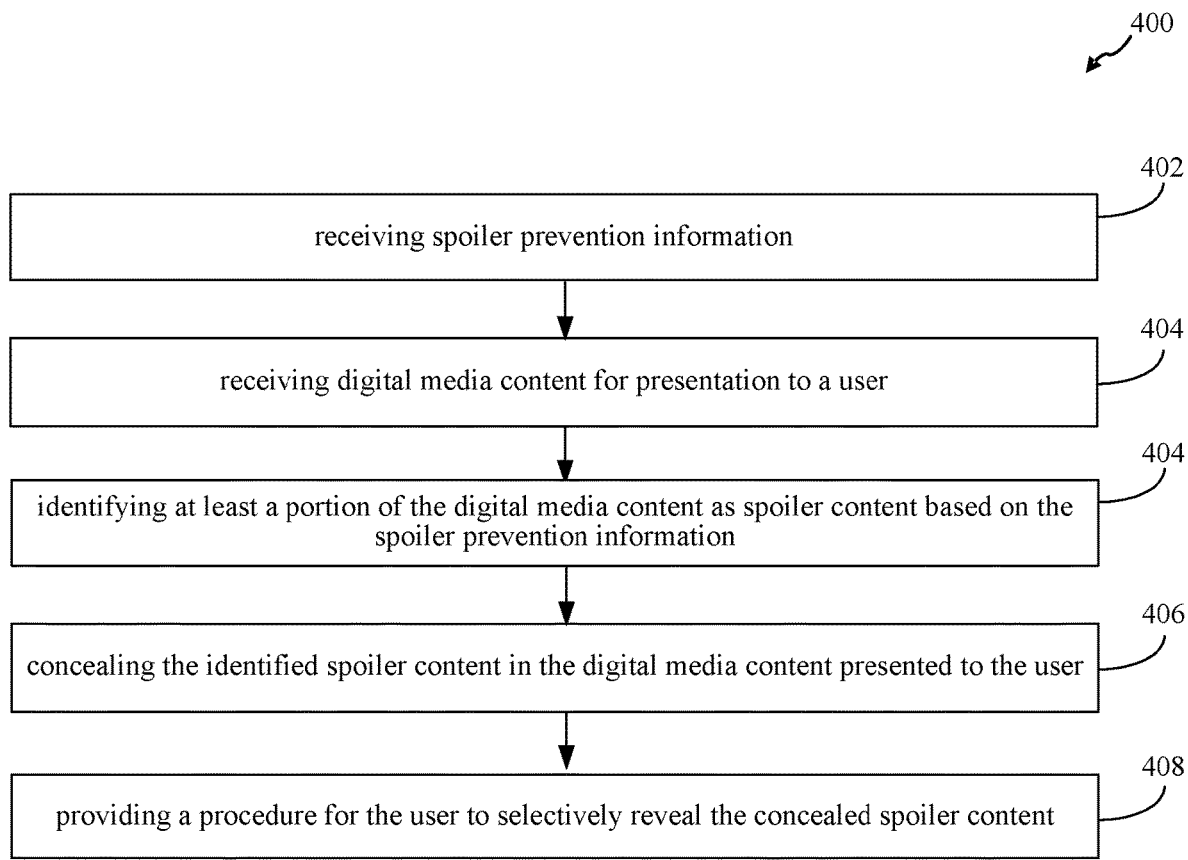
FIG. 4 shows a flowchart of an example method for spoiler prevention, according to an example embodiment.

Embodiments may be implemented in processes or methods. For example, FIG. 4 shows a flowchart of an example method for spoiler prevention, according to an example embodiment. Embodiments disclosed herein and other embodiments may operate in accordance with example method 400. Method 400 comprises steps 402-408. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

In step 402, spoiler prevention information may be received. For example, as shown in FIGS. 1-3, a spoiler prevention module, such as spoiler prevention 114A-N, 132, 142 and/or 152, individually or as combined/distributed modules, may receive spoiler prevention information from one or more sources, such as manual entry by user A-N 116A-N and/or automated retrieval (e.g., based on user authorization) from one or more sources (e.g., user interests and/or watch lists as may be indicated, for example, on a user's web browser interests, streaming services such as Netflix, Hulu, Amazon Prime, YouTube, social media accounts, and so on).

In step 404, digital media content for presentation to a user may be received. For example, as shown in FIGS. 1-3, a spoiler prevention module, such as spoiler prevention 114A-N, 132, 142 and/or 152, individually or as combined/distributed modules, may receive digital media content from one or more sources, such as via a content request submitted through content browser 112A-N to a webserver (e.g., content server(s) 140), a web crawler (e.g., searching content server(s) 140) searching and indexing content for a search engine, such as Microsoft Bing, Google, Yahoo, and so on. Content may comprise, for example, webpage content, which may include advertisements.

In step 404, at least a portion of the digital media content may be identified as spoiler content based on the spoiler prevention information. For example, as shown in FIGS. 1-3, a spoiler prevention module, such as spoiler prevention 114A-N, 132, 142 and/or 152, individually or as combined/distributed modules, may (i) search cached spoiler content to determine whether a prior access to the content identified spoiler content, (ii) search the digital media content for spoiler content based on the spoiler prevention information, (iii) identify any (e.g., pre-processed) spoiler content indicators (e.g., a spoiler content tag, marked up Webpage source code or other spoiler content indication) that may be in or associated with the digital media content and (iv) compare the content, including any spoiler indicators, to the spoiler prevention information. In the example, at least a portion of the digital media content is identified as spoiler content based on the spoiler prevention information.

In step 406, the identified spoiler content may be concealed in the digital media content presented to the user. For example, as shown in FIGS. 1-3, a spoiler prevention module, such as spoiler prevention 114A-N, 132, 142 and/or 152, individually or as combined/distributed modules, may conceal identified spoiler content. Content may be identified as spoiler content, for example, based on general and/or specific details in a user's spoiler prevention information. Concealing spoiler content may comprise, for example, at least one of blocking, removing, not displaying, covering, blurring, and not downloading.

In step 408, a procedure may be provided for the user to selectively reveal the concealed spoiler content. For example, as shown in FIGS. 1-3, a spoiler prevention module, such as spoiler prevention 114A-N, 132, 142 and/or 152, individually or as combined/distributed modules, may, for example as shown in FIGS. 3A-3D, detect user interest in the concealed spoiler content (e.g., detect that a pointer, such as a cursor, is positioned over and/or clicked on concealed content); present an option to reveal the concealed spoiler content (e.g., display a pop-up message explaining a reason for concealing the content and providing an icon to click to reveal or continue concealing); receive a selection responsive to the presented option; respond to the selection by revealing the concealed spoiler content (e.g., by displaying the previously concealed text, image, video, audio, begin autoplaying a video, etc.) or by continuing to conceal the concealed spoiler content; and/or request user feedback from the user to indicate whether the revealed spoiler content was or was not a spoiler for the user; where feedback may be used to update the spoiler prevention method or the spoiler prevention information.

As described herein, a user may selectively place an Internet browser into "spoiler free" mode, for example, generally (e.g., for all user interests) or for specific shows or events. A browser in "spoiler free" mode may attempt to detect spoilers on pages that a user browses and conceal them from a user (e.g., with a procedure for a user to selectively reveal concealed content).

A user may choose keywords (e.g., to represent user-perceptible content) that the user would like to be protected from spoiling first-hand experience. Keywords identified in digital media content (e.g., a post, tweet, advertisement, news article, and so on) may lead to content associated with the keyword being concealed.

User settings relating to user interests (e.g., Web browser settings, such as Microsoft Edge settings, social media settings, such as Facebook settings, and so on) may be used to determine spoiler content. In an example, a user may indicate that they are interested in Soccer or Game of Thrones (GoT). The user's news may be primed with information pertaining to the user's interests. This information may be leveraged to determine whether content is spoiler content.

Spoiler prevention may enable users to specify settings for spoiler prevention operation. For example, a user may choose to block certain times or block content all-together. A user may, for example, choose to block TV (e.g., only) spoilers within 24 hours of a show premiere or a user may choose to block all information about a show (e.g., because they are really far behind).

In examples, generic spoilers may be concealed. Spoiler prevention (e.g., ML model, algorithm or other logic) may utilize a collection of the most common keywords entered by many (e.g., all) users to detect what content is spoiler content, generally.

A spoiler prevention interface may permit a user to indicate a show or event as "seen" and (e.g., thereafter) see the associated content for the show or event.

In an example of ML model operation, a user may indicate interest in a show, such as "Survivor." Content (e.g., all content) related to "Survivor" (e.g., including content that may not explicitly reference the keyword "Survivor" may be identified and treated as spoiler content.

A user may unblock content (e.g., individual) content, for example, if the user wants to see particular content while maintaining spoiler prevention for other content. For example, spoiler content may be concealed with a procedure to selectively reveal concealed content (e.g., by hovering a cursor over concealed content, causing a button, such as "Show spoiler," to appear, which may be clicked to show concealed content).

All types of digital media content may be blocked (e.g., text, audio, video, images, advertisements, and so on), for example, as described herein.

In examples, spoiler prevention (e.g., algorithm, ML model and/or other logic) may be integrated with streaming services (e.g., Netflix, Hulu, etc.). Spoiler prevention may be integrated with a user's watch list, which may enable automated determination of spoiler content. In examples, a user may have a show on her watchlist, but may not have watched the most recent episode (e.g., as indicated by a streaming service). Spoiler prevention may (e.g., only) identify as spoiler content web content pertaining to the most recent episode. Episodes may be automatically removed from a block or conceal list, for example, after the user watches the episodes.

Spoiler prevention may be applied to sports. Sports content may be consumed or experienced via streaming services (e.g., ESPN+, NFL Sunday Ticket, etc.), which allows users to watch games in a time-delayed or skipped fashion (e.g., after a game has actually been played). Spoiler prevention may conceal/block content (e.g., stories and score reports) for games until the user indicates (e.g., manually or automatically) that she has watched them (e.g., in full).

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
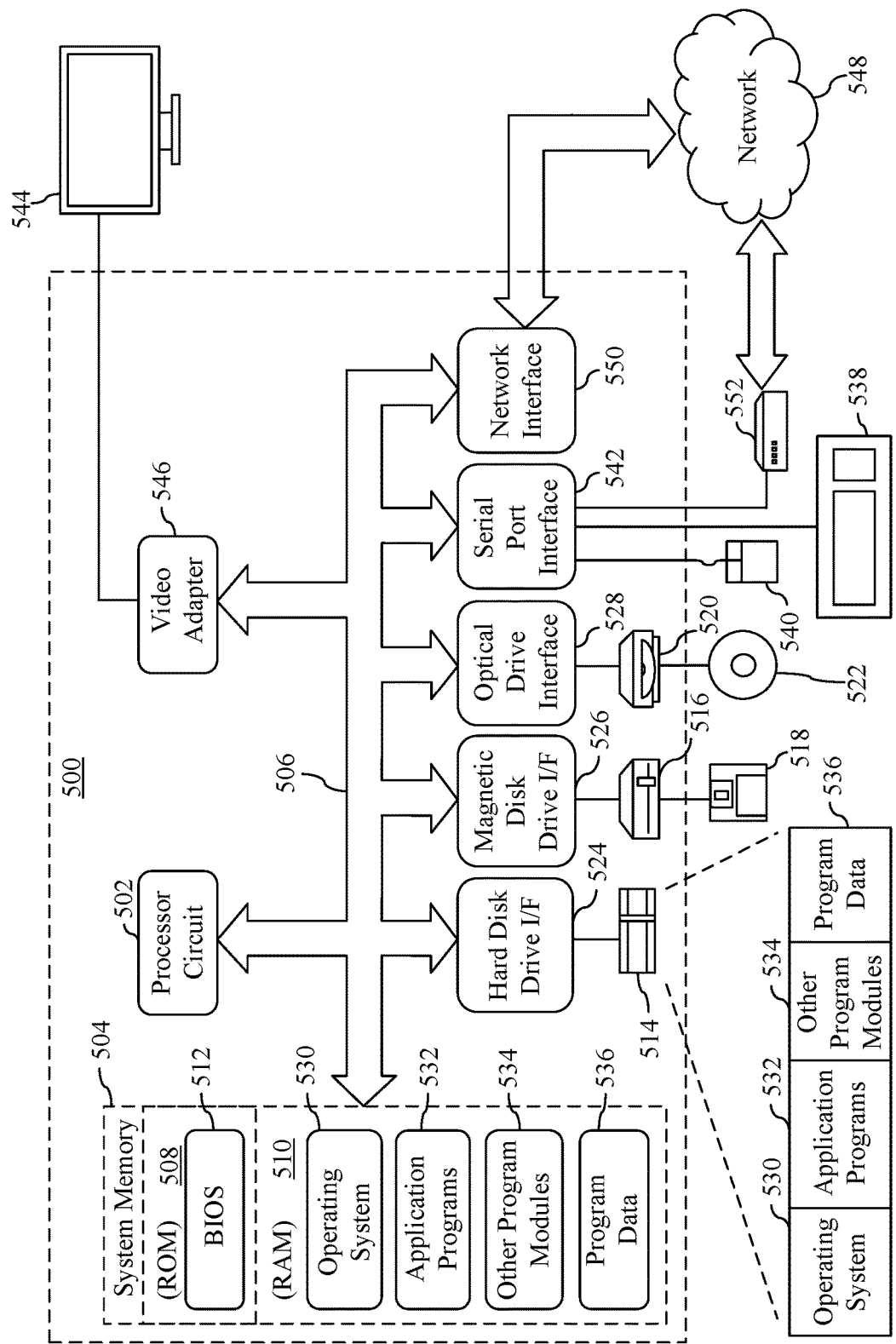
FIG. 5 shows a block diagram of an example computing device that may be used to implement example embodiments.

FIG. 5 shows an exemplary implementation of a computing device 500 in which example embodiments may be implemented. Consistent with all other descriptions provided herein, the description of computing device 500 is a non-limiting example for purposes of illustration. Example embodiments may be implemented in other types of computer systems, as would be known to persons skilled in the relevant art(s). Computing device 500 may comprise, for example, an implementation of any one of client computing device(s) 110A-N, authentication computing device(s) 120, admin computing device(s) 130, server computing device(s) 140, or user computing device(s) 150 as described above in reference to FIG. 1.

As shown in FIG. 5, computing device 500 includes one or more processors, referred to as processor circuit 502, a system memory 504, and a bus 506 that couples various system components including system memory 504 to processor circuit 502. Processor circuit 502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 502 may execute program code stored in a computer readable medium, such as program code of operating system 530, application programs 532, other programs 534, etc. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random-access memory (RAM) 510. A basic input/output system 512 (BIOS) is stored in ROM 508.

Computing device 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 530, one or more application programs 532, other programs 534, and program data 536. Application programs 532 or other programs 534 may include, for example, computer program logic (e.g., computer program code or instructions) for implementing any of the components shown in FIGS. 1-3 (e.g., client service(s) 112, SSH client 114, authentication service 122, application(s) 132, server service(s) 142, SSH server 144, application(s) 152, private network web server 305, private network "connector" 310, or cloud tunnel server 315), any of the steps of the flowcharts depicted in FIGS. 4-6.

A user may enter commands and information into the computing device 500 through input devices such as keyboard 538 and pointing device 540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 502 through a serial port interface 542 that is coupled to bus 506, but may be connected by other interfaces, such as a parallel port, game port, or a universal serial bus (USB).

A display screen 544 is also connected to bus 506 via an interface, such as a video adapter 546. Display screen 544 may be external to, or incorporated in computing device 500. Display screen 544 may display information, as well as being a user interface for receiving user commands and/or other information (e.g., by touch, finger gestures, virtual keyboard, etc.). In addition to display screen 544, computing device 500 may include other peripheral output devices (not shown) such as speakers and printers.

Computing device 500 is connected to a network 548 (e.g., the Internet) through an adaptor or network interface 550, a modem 552, or other means for establishing communications over the network. Modem 552, which may be internal or external, may be connected to bus 506 via serial port interface 542, as shown in FIG. 5, or may be connected to bus 506 using another interface type, including a parallel interface.

As used herein, the terms "computer program medium," "computer-readable medium," and "computer-readable storage medium" are used to refer to physical hardware media such as the hard disk associated with hard disk drive 514, removable magnetic disk 518, removable optical disk 522, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 532 and other programs 534) may be stored on the hard disk, magnetic disk, optical disk, ROM, RAM, or other hardware storage medium. Such computer programs may also be received via network interface 550, serial port interface 542, or any other interface type. Such computer programs, when executed or loaded by an application, enable computing device 500 to implement features of example embodiments described herein. Accordingly, such computer programs represent controllers of the computing device 500.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

Methods, systems and computer program products are provided for spoiler prevention. Media consumption applications (e.g., Web browsers) may be placed in "spoiler-free" mode, for example, to prevent media content (e.g., advertisements, articles, user posts, search results, etc. in the form of text, photos, videos, audio, etc.) from spoiling first-hand user experience (e.g., viewing a movie, viewing TV episodes, listening to a concert, viewing a sports competition, reading a book, etc.). A user may opt in/out of spoiler free mode. A user may provide spoiler prevention information (e.g., identify interests and media, such as movies, episodes, books, concerts, etc., the user has and has not experienced)). A user may authorize automated access to and use of the user's information (e.g., streaming media service watch lists, social media interests). A user may request digital media content (e.g., while surfing the Internet). Digital media content to be presented to a user (e.g., and additional content, such as ads and/or user posts) may be searched in real-time and/or pre-searched (e.g., during web crawling and/or based on cached spoiler-related information for other content requests) for spoiler content and/or associated spoiler indications (e.g., spoiler content tags) relative to spoiler prevention information (e.g., movies, television series, sports competitions, books, and the like that a user has or has not experienced). Identified spoiler content may be concealed from users (e.g., by marking up Webpage code, blocking, removing, not displaying, covering, blurring, and not downloading content). A procedure may be provided for users to determine one or more reasons why content is concealed, to selectively reveal concealed content, and to provide feedback whether concealed content was or was not spoiler content for a user. Feedback may be used to improve spoiler prevention, for example, by retraining a machine learning model, which may be user-specific.

In examples, a spoiler prevention method may comprise, for example, receiving spoiler prevention information (e.g., directly or indirectly from a user pertaining to user interests, user watching or reading lists, such as movies, TV shows, TV episodes, sports, books, etc.); receiving digital media content (e.g., Webpage content from a Web server) to be presented to a user; identifying at least a portion of the digital media content as spoiler content based on the spoiler prevention information; and concealing the identified spoiler content in the digital media content to be presented to the user (e.g., by blocking, removing, not displaying, covering, blurring, not downloading).

In examples, the spoiler prevention method may be user-specific. For example, a spoiler prevention method may be implemented by a user-specific machine learning model, which may be improved, for example, based on acquiring more information about a user over time and/or based on user feedback.

A method may (e.g., further) comprise, for example, performing at least one of the following: searching the digital media content for spoiler content based on the spoiler prevention information; and identifying at least one spoiler content indicator (e.g., a spoiler content tag, marked up Webpage source code or other spoiler content indication) associated with the digital media content and comparing the spoiler content indicator to the spoiler prevention information.

Receiving the spoiler prevention information may comprise, for example, at least one of extracting user interests specified for a Web browser and accessing a user's media content watch list (e.g., via streaming service, programs recorded or scheduled for recording, social media and other website accounts that may indicate interests and viewing/reading lists).

Receiving the digital media content may comprise, for example, downloading content from the world wide web (WWW) using a Web browser. Digital media may include, for example, content presented in search results, webpages, advertisements, etc.

Concealing spoiler content may comprise, for example, at least one of blocking, removing, not displaying, covering, blurring, and not downloading.

Identifying at least a portion of the digital media content as spoiler content may comprise, for example, identifying (e.g., for example, tracking) episodes watched by a user for a series or other portion of related digital media content of interest to a user (e.g., distinguishing between episodes watched and not watched by a user); and identifying the at least a portion of the digital media content as pertaining to information about an episode of the series or other portion of related digital media content of interest to the user that the user has not yet watched.

A method may (e.g., further) comprise, for example, providing a procedure for the user to selectively reveal the concealed spoiler content by: detecting user interest in the concealed spoiler content (e.g., positioning a pointer, such as a cursor, over and/or clicking on concealed content); presenting an option to reveal the concealed spoiler content (e.g., a pop-up message explaining a reason for concealing the content and providing an icon to click to reveal or continue concealing); receiving a selection responsive to the presented option; and responding to the selection by revealing the concealed spoiler content (e.g., display the previously concealed text, image, video, audio, begin autoplaying a video, etc.) or by continuing to conceal the concealed spoiler content.

Presenting an option to reveal the concealed spoiler content may comprise, for example, presenting a message indicating a reason for identifying (e.g., and concealing) at least a portion of the digital media content as spoiler content.

A method may (e.g., further) comprise, for example, requesting user feedback from the user to indicate whether the revealed spoiler content was or was not a spoiler for the user; and updating the spoiler prevention method or the spoiler prevention information based on the user feedback.

A method may (e.g., further) comprise, for example, presenting an option to selectively enable and disable the method (e.g., by selecting between a spoiler-free mode and a spoiler-allowed mode); and presenting an option to provide access to a user's non-public information to determine spoiler prevention information.

In examples, a spoiler prevention system may comprise, for example, one or more processors; and one or more memory devices that store spoiler prevent program code configured to be executed by the one or more processors to perform a spoiler prevention method comprising, for example, receiving spoiler prevention information pertaining to a user; receiving digital media content for presentation to the user; identifying at least a portion of the digital media content as spoiler content based on the spoiler prevention information; and concealing the identified spoiler content in the digital media content displayed to the user.

A spoiler prevention method implemented by a spoiler prevention system may (e.g., further) comprise, for example, crawling webpages on the world wide web (WWW); searching the crawled webpages content for potential spoiler content for a plurality of users; identifying a plurality of potential spoiler content; associating the identified potential spoiler content with spoiler content indicators (e.g., by marking up Webpage source code, for example, with a spoiler content tag). Identifying at least a portion of the digital media content as spoiler content may comprise, for example, matching a spoiler content indicator associated with the digital media content to the spoiler prevention information.

A spoiler prevention method implemented by a spoiler prevention system may (e.g., further) comprise, for example, caching spoiler content identified for a plurality of requests from a plurality of users for digital media content (e.g., including the spoiler content); and searching the cached spoiler content in response to requests for digital media content. Identifying at least a portion of the digital media content as spoiler content may comprise matching the cached spoiler content to the spoiler prevention information.

The spoiler prevention method may be implemented, at least in part, by a user-specific machine learning model, which may be updated based on additional information about a user and/or based on user feedback.

Concealing the identified spoiler content may comprise, for example, marking up code representing the digital media content to provide an option for a user to selectively reveal the concealed spoiler content; requesting user feedback from the user whether the revealed spoiler content was or was not a spoiler for the user; and updating the user-specific machine learning model based on the user feedback.

In examples, a computer-readable storage medium having program instructions recorded thereon may, when executed by a processing circuit, perform a method comprising, for example, receiving spoiler prevention information pertaining to a user; receiving (e.g., obtaining) digital media content to be presented to the user; searching the digital media content for spoiler content based on the spoiler prevention information; identifying at least a portion of the digital media content as spoiler content based on the spoiler prevention information; and concealing the identified spoiler content in the digital media content to be presented to the user.

The method may (e.g., further) comprise, for example, providing a procedure for the user to selectively reveal the concealed spoiler content by: detecting user interest in the concealed spoiler content; presenting an option to reveal the concealed spoiler content; receiving a selection responsive to the presented option; and responding to the selection by revealing the concealed spoiler content or continuing to conceal the concealed spoiler content.

The method may (e.g., further) comprise, for example, performing at least one of the following: searching the digital media content for spoiler content based on the spoiler prevention information; and identifying at least one spoiler content indicator associated with the digital media content and comparing the spoiler content indicator to the spoiler prevention information.

Identifying at least a portion of the digital media content as spoiler content may comprise, for example, identifying episodes watched by a user for a series or other portion of related digital media content of interest to a user; and identifying the at least a portion of the digital media content as pertaining to information about an episode of the series or other portion of related digital media content of interest to the user that the user has not yet watched.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A spoiler prevention method implemented at least in part by a user-specific machine learning model, the spoiler prevention method comprising:
    receiving spoiler prevention information;
    receiving digital media content to be presented to a user;
    identifying at least a portion of the digital media content as spoiler content based on the spoiler prevention information;
    concealing the identified spoiler content in the digital media content to be presented to the user;
    providing a procedure for the user to selectively reveal the concealed spoiler content;
    responsive to the user selectively revealing the concealed spoiler content, requesting the user to provide user feedback to indicate whether the revealed spoiler content was or was not a spoiler for the user;
    receiving the user feedback from the user; and
    updating the user-specific machine learning model based on the user feedback.

2. The spoiler prevention method of claim 1, further comprising:
    performing at least one of the following:
        searching the digital media content for spoiler content based on the spoiler prevention information; and
        identifying at least one spoiler content indicator associated with the digital media content and comparing the spoiler content indicator to the spoiler prevention information.

3. The spoiler prevention method of claim 1, wherein receiving the spoiler prevention information comprises at least one of extracting user interests specified for a Web browser and accessing a user's media content watch list.

4. The spoiler prevention method of claim 1, wherein receiving the digital media content comprises downloading content from the world wide web (WWW) using a Web browser.

5. The spoiler prevention method of claim 1, wherein the concealing comprises at least one of blocking, removing, not displaying, covering, binning, and not downloading.

6. The spoiler prevention method of claim 1, wherein identifying at least a portion of the digital media content as spoiler content comprises:
    identifying episodes watched by a user for a series or other portion of related digital media content of interest to a user; and
    identifying the at least a portion of the digital media content as pertaining to information about an episode of the series or other portion of related digital media content of interest to the user that the user has not yet watched.

7. The spoiler prevention method of claim 1, wherein:
    said providing a procedure for the user to selectively reveal the concealed spoiler content comprises:
        detecting user interest in the concealed spoiler content;
        presenting an option to reveal the concealed spoiler content;
        receiving a selection responsive to the presented option; and
        responding to the selection by revealing the concealed spoiler content or continuing to conceal the concealed spoiler content.

8. The spoiler prevention method of claim 7, wherein presenting the option to reveal the concealed spoiler content comprises presenting a message indicating a reason for identifying at least a portion of the digital media content as spoiler content.

9. The spoiler prevention method of claim 1, further comprising:
    presenting an option to selectively enable and disable the method; and
    presenting an option to provide access to a user's non-public information to determine spoiler prevention information.

10. A spoiler prevention system, comprising
    one or more processors; and
    one or more memory devices that store spoiler prevent program code configured to be executed by the one or more processors to perform a spoiler prevention method, the spoiler prevention method being implemented at least in part by a user-specific machine learning model, the spoiler prevention method comprising:
        receiving spoiler prevention information pertaining to ae user;
        receiving digital media content for presentation to the one user;
        identifying at least a portion of the digital media content as spoiler content based on the spoiler prevention information;
        concealing the identified spoiler content in the digital media content displayed to the user;

providing a procedure for the user to selectively reveal the concealed spoiler content;
responsive to the user selectively revealing the concealed spoiler content, requesting the user to provide user feedback to indicate Whether the revealed spoiler content was or was not a spoiler for the user;
receiving the user feedback from the user; and
updating the user-specific machine learning model base on the user feedback.

11. The spoiler prevention system of claim 10, wherein the spoiler prevention method further comprises:
crawling webpages on the world wide web (WWW);
searching the crawled webpages content for potential spoiler content for a plurality of users;
identifying a plurality of potential spoiler content; and
associating the identified potential spoiler content with spoiler content indicators;
wherein identifying at least a portion of the digital media content as spoiler content comprises matching a spoiler content indicator associated with the digital media content to the spoiler prevention information.

12. The spoiler prevention system of claim 10, wherein the spoiler prevention method further comprises:
caching spoiler content identified for a plurality of requests from a plurality of users for, digital media content, wherein the cached spoiler content includes the spoiler content; and
searching the cached spoiler content in response to requests for digital media content;
wherein identifying at least a portion of the digital media content as spoiler content comprises matching the cached spoiler content to the spoiler prevention information.

13. The spoiler prevention system of claim 10, wherein:
said concealing the identified spoiler content comprises:
marking up code representing the digital media content to provide an option for a user to selectively reveal the concealed spoiler content.

14. A computer-readable storage medium having program instructions recorded thereon that, when executed by a processing circuit, perform a method implemented at least in part by a user-specific machine learning model, the method comprising:
receiving spoiler prevention information pertaining to a user;
receiving digital media content to be presented to the user;
searching the digital media content for spoiler content based on the spoiler prevention information;
identifying at least a portion of the digital media content as spoiler content based on the spoiler prevention information;
concealing the identified spoiler content in the digital media content to be presented to the at least one user;
providing a providing a procedure for the user to selectively reveal the concealed spoiler content;
responsive to the user selectively revealing the concealed spoiler content, requesting the user to provide user feedback to indicate whether the revealed spoiler content was or was not a spoiler for the user;
receiving the user feedback from the user; and
updating the user-specific machine learning model based on the user feedback.

15. The computer-readable storage medium of claim 14, Wherein:
said providing a procedure for the user to selectively reveal the concealed spoiler content comprises:
detecting user interest in the concealed spoiler content;
presenting an option to reveal the concealed spoiler content;
receiving a selection responsive to the presented option; and
responding to the selection by revealing the concealed spoiler content or continuing to conceal the concealed spoiler content.

16. The computer-readable storage medium of claim 14, wherein the method further comprises:
performing at least one of the following:
searching the digital media content for spoiler content based on the spoiler prevention information; and
identifying at least one spoiler content indicator associated with the digital media content and comparing the spoiler content indicator to the spoiler prevention information.

17. The computer-readable storage medium of claim 14, wherein identifying at least a portion of the digital media content as spoiler content comprises:
identifying episodes watched by a user for a series or other portion of related digital media content of interest to a user;
identifying the at least a portion of the digital media content as pertaining to information about an episode of the series or other portion of related digital media content of interest to the user that the user has not yet watched.

18. The spoiler prevention system of claim 10, wherein:
said providing a procedure for the user to selectively reveal the concealed spoiler content comprises:
detecting user interest in the concealed spoiler content;
presenting an option to reveal the concealed spoiler content;
receiving a selection responsive to the presented option; and
responding to the selection by revealing the concealed spoiler content or continuing to conceal the concealed spoiler content.

19. The spoiler prevention system of claim 10, wherein the spoiler prevention method further comprises:
presenting an option to selectively enable and disable the method; and
presenting an option to provide access to a user's non-public information to determine spoiler prevention information.

20. The computer-readable storage medium of claim 14, wherein the method further comprises:
presenting an option to selectively enable and disable the method; and
presenting an option to provide access to a user's non-public information to determine spoiler prevention information.

* * * * *